US011976677B2

(12) United States Patent
Ruiz et al.

(10) Patent No.: US 11,976,677 B2
(45) Date of Patent: May 7, 2024

(54) INTEGRALLY FORMED FLOW DISTRIBUTOR FOR FLUID MANIFOLD

(71) Applicant: Hamilton Sundstrand Corporation, Charlotte, NC (US)

(72) Inventors: Gabriel Ruiz, Broad Brook, CT (US); Mark A. Zaffetti, Suffield, CT (US); Jeremy M. Strange, Windsor, CT (US)

(73) Assignee: Hamilton Sundstrand Corporation, Charlotte, NC (US)

(*) Notice: Subject to any disclaimer, the term of this patent is extended or adjusted under 35 U.S.C. 154(b) by 0 days.

(21) Appl. No.: 17/520,101

(22) Filed: Nov. 5, 2021

(65) Prior Publication Data

US 2023/0146097 A1 May 11, 2023

(51) Int. Cl.
*F15D 1/02* (2006.01)
*F28F 9/02* (2006.01)

(52) U.S. Cl.
CPC ............ *F15D 1/025* (2013.01); *F28F 9/0265* (2013.01)

(58) Field of Classification Search
CPC ..................................................... F15D 9/0265
USPC ............................................................ 138/40
See application file for complete search history.

(56) References Cited

U.S. PATENT DOCUMENTS 1,092,279 A * 4/1914 Martin et al. ............ F02M 1/00 138/40
1,139,912 A * 5/1915 Simons .................... F02M 1/00 138/40
1,178,891 A * 4/1916 Walther ................... F02M 1/00 138/40
1,311,737 A * 7/1919 Allen ....................... F02M 1/00 138/40
1,453,656 A * 5/1923 Bonnell ................... F02M 1/00 138/40
1,942,187 A * 1/1934 Ruffino .................... F02M 1/00 138/40
1,949,803 A * 3/1934 Loebs ...................... F02M 1/00 138/40

(Continued)

FOREIGN PATENT DOCUMENTS

EP 2889570 B1 8/2017
EP 3410054 A1 12/2018
JP 2018061937 A 4/2018

OTHER PUBLICATIONS

Extended European Search Report for European Patent Application No. 22205651.7, dated Mar. 24, 2023, 5 pages.

*Primary Examiner* — David R Deal
(74) *Attorney, Agent, or Firm* — Kinney & Lange, P.A.

(57) ABSTRACT

A fluid manifold includes an inlet comprising an opening into an interior of the fluid manifold, an outlet end that is positioned opposite the inlet and that is in fluid communication with the inlet, a shroud extending between the inlet and the outlet end and surrounding a flow path of the fluid manifold, and a first flow distributor positioned within the interior of the fluid manifold. The first flow distributor includes a hollow body including a first surface at a downstream side of the first flow distributor and a second surface at an upstream side of the first flow distributor, a central cavity defined by the second surface of the hollow body, and openings extending from the first surface to the second surface such that a fluid can pass from the central cavity through the openings. The first flow distributor and the fluid manifold are integrally formed.

19 Claims, 11 Drawing Sheets

(56) References Cited

U.S. PATENT DOCUMENTS

| | | | | | |
|---|---|---|---|---|---|
| 2,216,846 | A * | 10/1940 | Lewis | B01F 25/4315 138/40 |
| 4,114,580 | A * | 9/1978 | Coats | F02M 29/04 123/593 |
| 5,590,523 | A * | 1/1997 | Fox | F01N 13/00 60/307 |
| 10,539,378 | B2 | 1/2020 | Diffey et al. | |
| 10,830,543 | B2 | 11/2020 | Schmitz et al. | |
| 11,029,102 | B2 | 6/2021 | Basini | |
| 2014/0345837 | A1 | 11/2014 | Alahyari et al. | |
| 2016/0238046 | A1* | 8/2016 | Reiss | F15D 1/025 |
| 2017/0328653 | A1 | 11/2017 | O'Coin et al. | |
| 2020/0041375 | A1* | 2/2020 | Bowdle | F15D 1/025 |
| 2021/0180872 | A1 | 6/2021 | O'Coin et al. | |
| 2021/0254906 | A1 | 8/2021 | Basini | |

* cited by examiner

INTEGRALLY FORMED FLOW DISTRIBUTOR FOR FLUID MANIFOLD

BACKGROUND

The present disclosure relates generally to fluid manifolds, and more specifically to flow distribution features (i.e., flow distributors) of fluid manifolds.

In general, fluid manifolds are designed to route one or more fluids between components in a fluid flow system. For example, heat exchangers typically include manifolds (i.e., headers) to route fluid flow into and out of the heat exchanger core. Heat exchanger cores have multiple flow paths, and the flow distribution throughout the flow paths can affect heat exchanger performance. Heat exchangers and other components may experience high velocity flow or may have asymmetries that affect flow distribution. Flow distribution features can be implemented in a fluid manifold to modify the flow distribution.

SUMMARY

In one example, a fluid manifold includes an inlet comprising an opening into an interior of the fluid manifold, an outlet end that is positioned opposite the inlet and that is in fluid communication with the inlet, a shroud extending between the inlet and the outlet end and surrounding a flow path of the fluid manifold, and a first flow distributor positioned within the interior of the fluid manifold. The first flow distributor includes a hollow body that extends in a downstream direction. The hollow body includes a first surface at a downstream side of the first flow distributor and a second surface at an upstream side of the first flow distributor, a central cavity defined by the second surface of the hollow body, and openings extending from the first surface to the second surface such that a fluid can pass from the central cavity through the openings to be directed within the fluid manifold. The first flow distributor and the fluid manifold are integrally formed.

In another example, a flow distributor for a fluid manifold includes a hollow body including a first surface at a downstream side of the flow distributor and a second surface at an upstream side of the flow distributor, a central cavity defined by the second surface of the hollow body, and openings extending from the first surface to the second surface such that a fluid can pass from the central cavity through the openings to be directed within the fluid manifold.

DETAILED DESCRIPTION

An integrally formed flow distributor and fluid manifold is described herein. In fluid flow systems, an inlet of a fluid manifold may be positioned at a center of the manifold so that fluid flow exiting the manifold is as distributed (i.e., uniform) as possible. However, this may not be achievable in many applications. Moreover, even when the inlet is aligned with the manifold the fluid flow may be a high velocity flow that does not spread out adequately in the relatively short distance to an outlet end of the manifold. The manifold can also have asymmetries and experience high velocity flow in combination. In traditional applications, a flow distributor can be implemented in the manifold to achieve improved flow distribution, but this can introduce undesired additional manufacturing steps. For example, the traditional manifold and flow distributor may be machined separately and attached by welding. Additionally, the design of a traditionally manufactured flow distributor could be limited by traditional machining requirements (e.g., tooling paths, etc.) such that variations of the flow distributor geometry can be difficult, impossible, or cost prohibitive to manufacture. The integrally formed flow distributor described herein can reduce the need for additional manufacturing steps and can more effectively optimize flow distribution within the manifold. The integrally formed flow distributor is described below with reference to FIGS. 1-10E.

Figure 1:
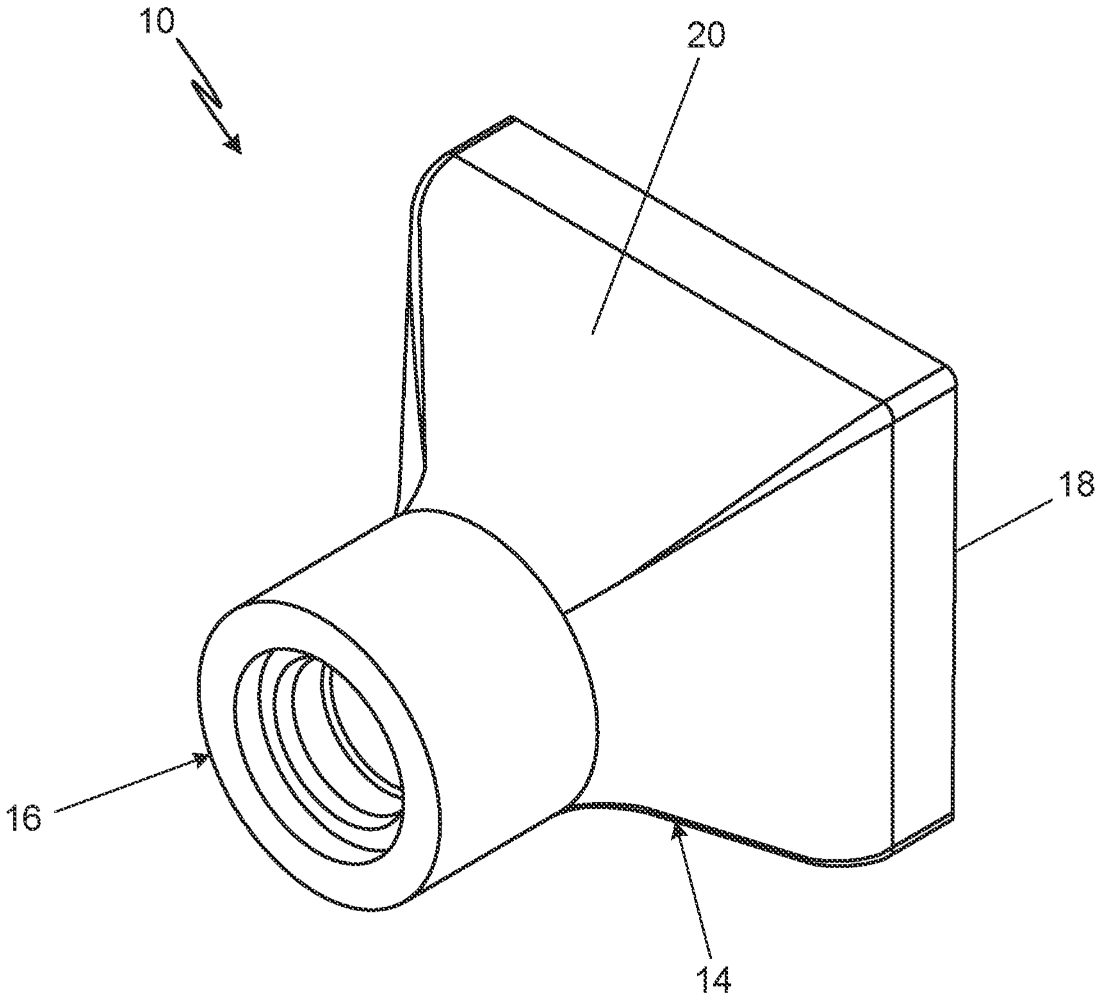
FIG. 1 is an isometric view of a fluid manifold.
Figure 3:
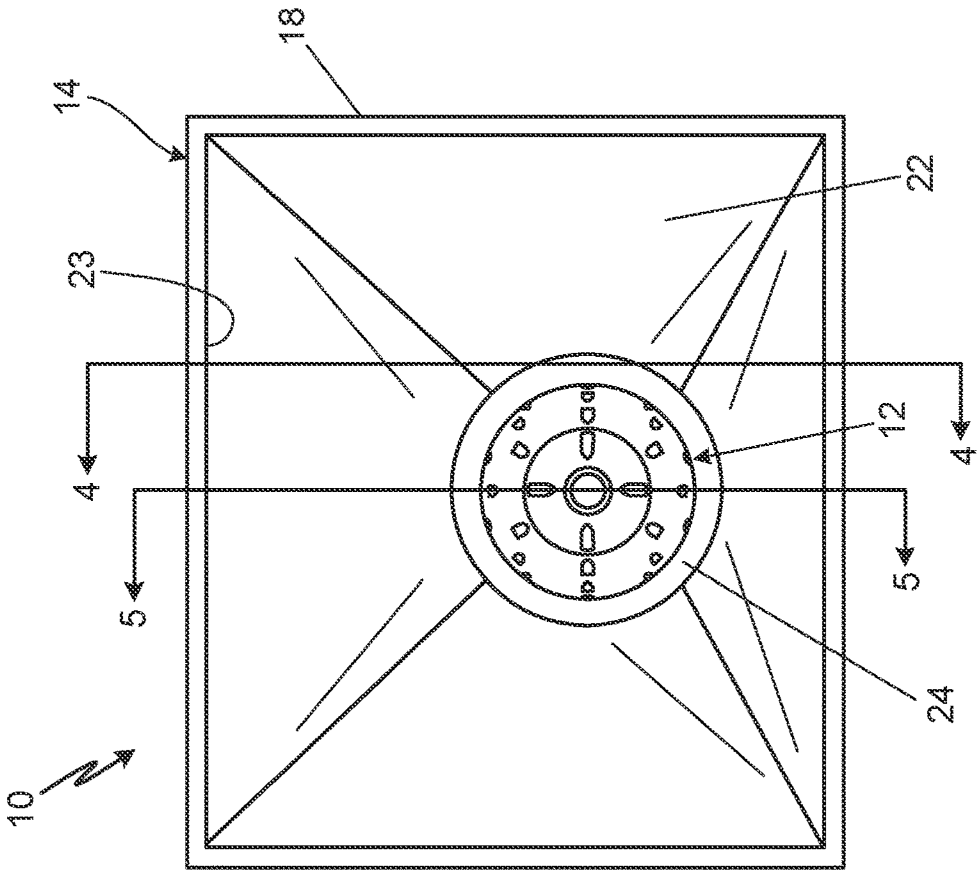
FIG. 3 is a top view of the fluid manifold showing a flow distributor.
Figure 2:
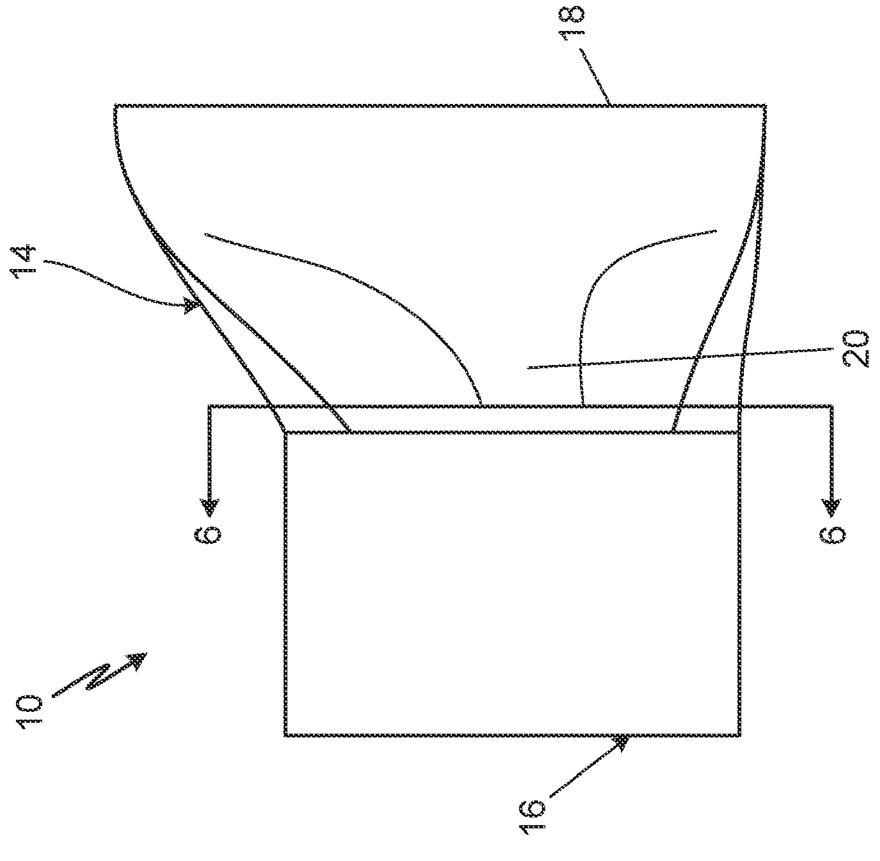
FIG. 2 is a side view of the fluid manifold.
Figure 4:
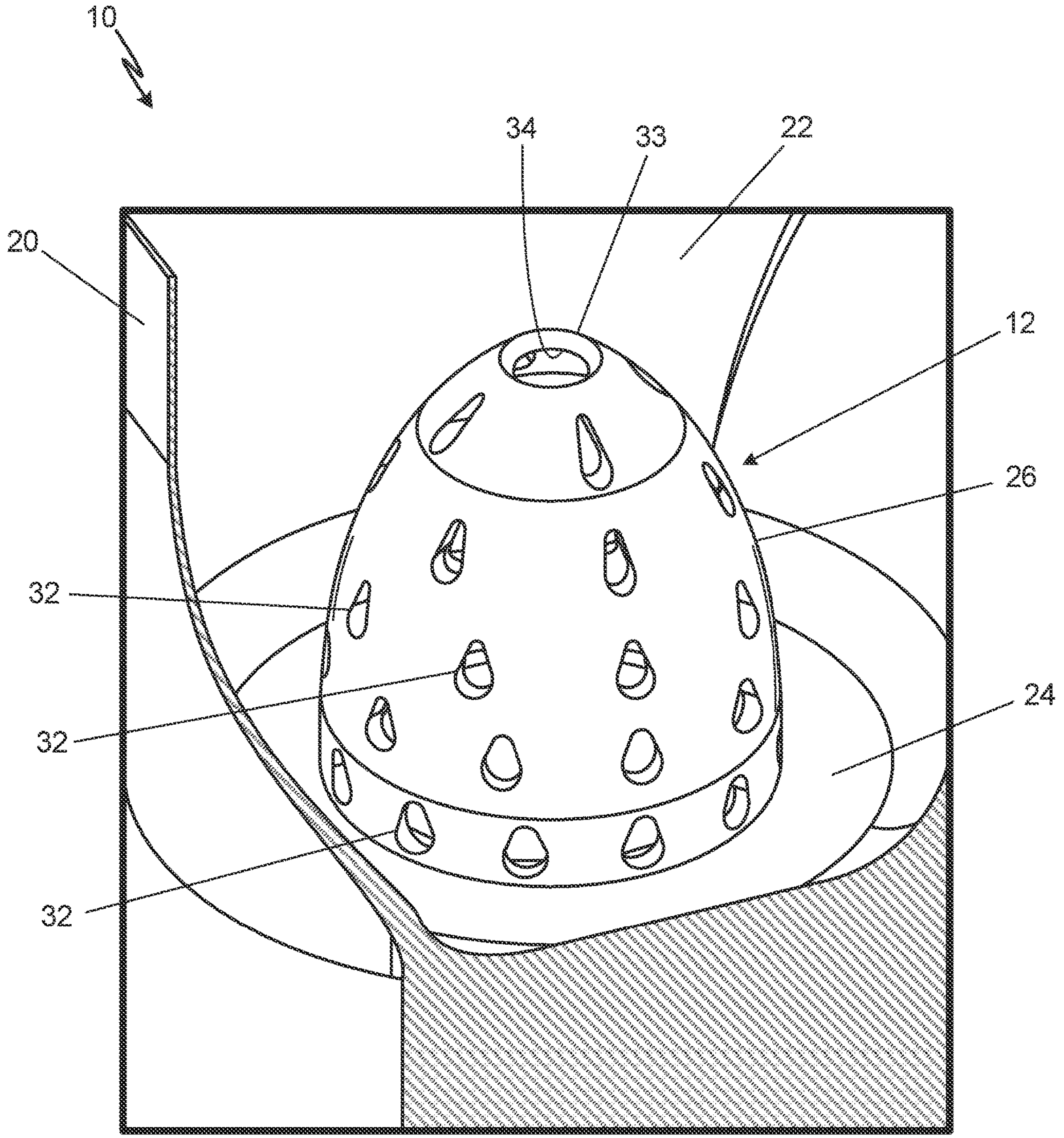
FIG. 4 is an enlarged partial cross-sectional view of the fluid manifold taken at line 4-4 of FIG. 3 showing details of the flow distributor.
Figure 5:
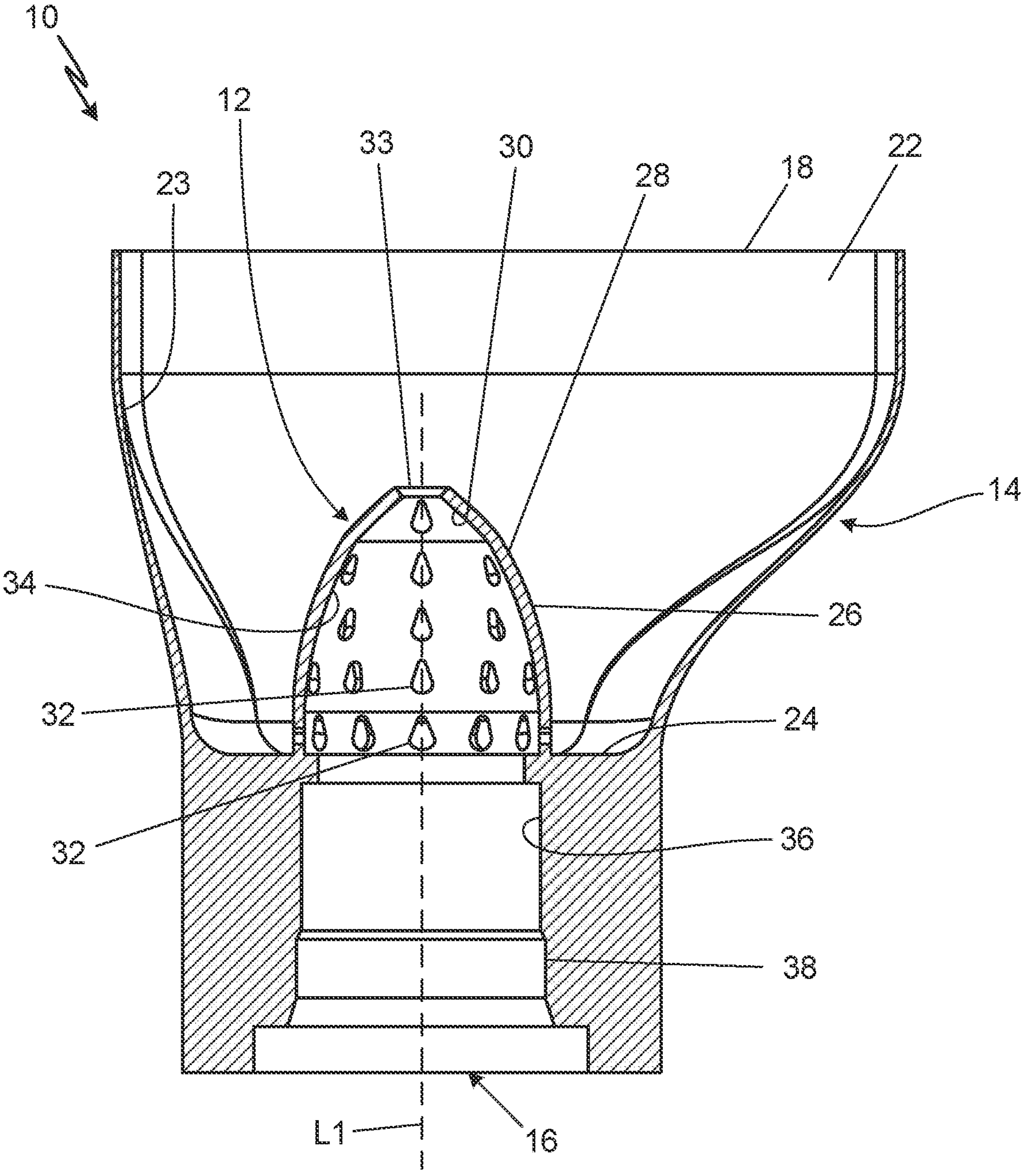
FIG. 5 is a cross-sectional view of the fluid manifold and the flow distributor taken at line 5-5 of FIG. 3.

FIGS. 1-6D will be discussed together. FIG. 1 is an isometric view of fluid manifold 10. FIG. 2 is a side view of fluid manifold 10. FIG. 3 is a top view of fluid manifold 10 showing flow distributor 12. FIG. 4 is an enlarged partial cross-sectional view of fluid manifold 10 taken at line 4-4 of FIG. 3 showing details of flow distributor 12. FIG. 5 is a cross-sectional view of fluid manifold 10 and flow distributor 12 taken at line 5-5 of FIG. 3. FIGS. 6A-6D are cross-sectional views of fluid manifold 10 taken at line 6-6 of FIG. 2 showing alternative cross-sectional shapes of flow distributors 12A-12D.

Manifold 10 includes flow distributor 12, shroud 14, inlet 16, and outlet end 18. Shroud 14 includes exterior surface 20, interior surface 22, interior passageway (i.e., cavity) 23, and floor 24. Flow distributor 12 includes body 26, first surface 28 (i.e., downstream surface 28), second surface 30 (i.e., upstream surface 30), openings 32, top opening 33, and central cavity 34. Flow distributor 12 defines longitudinal axis L1. Inlet 16 includes primary channel 36 and connection portion 38.

Inlet 16 forms an opening into the fluid system of manifold 10. Inlet 16 is positioned at a first, or upstream, end of manifold 10 that is opposite outlet end 18. As shown in FIG. 5, primary channel 36 of inlet 16 is a channel or passageway extending from the opening of inlet 16 into an interior of manifold 10. Primary channel 36 extends within manifold 10 to floor 24 of shroud 14. Primary channel 36 can have a circular or other cross-sectional area.

Inlet 16 can further include connection portion 38 adjacent or near the opening. Connection portion 38 is a portion of inlet 16 where manifold 10 can be connected to another component(s) or duct. Though connection portion 38 is illustrated in FIG. 5 as threads in primary channel 36, it should be understood that other suitable connection means are possible.

Shroud 14 is a main body portion of manifold 10. Shroud 14 extends between inlet 16 and outlet end 18. Moreover, shroud 14 can be continuous with inlet 16 and outlet end 18. Shroud 14 surrounds a portion of a flow path of manifold 10. Exterior surface 20 of shroud 14 extends from inlet 16 to outlet end 18 and is at an exterior of shroud 14. Interior surface 22 of shroud 14 extends from inlet 16 to outlet end 18 and is at an interior of shroud 14. Exterior surface 20 and interior surface 22 meet at inlet 16 and at outlet end 18.

Interior surface 22, including floor 24, defines interior passageway 23 within shroud 14. Interior passageway 23 is a passageway or cavity within shroud 14 that extends from primary channel 36 to outlet end 18. As such, primary channel 36 of inlet 16 is a first, or upstream, passageway that is fluidly connected to and continuous with interior passageway 23. As described above, primary channel 36 extends within manifold 10 to floor 24 of shroud 14. At floor 24, a cross-sectional area of interior passageway 23 can expand radially outward from the cross-sectional area of primary channel 36. In other words, interior passageway 23 can be tapered toward floor 24 from outlet end 18. More generally, interior passageway 23 can have a larger cross-sectional area than the cross-sectional area of primary channel 36.

As shown in FIGS. 1-5, shroud 14 can be generally bell-shaped to accommodate interior passageway 23 and any interior components contained within shroud 14 (e.g., flow distributor 12). However, it should be understood that a three-dimensional shape of shroud 14 can be any suitable shape for accommodating interior passageway 23 and any interior components. Furthermore, the three-dimensional shape of shroud 14 can also depend on a geometry of a downstream component that is connected to outlet end 18. Walls of shroud 14 (formed by exterior surface 20 and interior surface 22) can be partially or entirely curved or contoured or can be partially or entirely straight.

Additionally, as is most easily viewed in FIGS. 2, 3, and 5, shroud 14 (and portions of interior passageway 23) may be asymmetric about longitudinal axis L1 of flow distributor 12 and inlet 16. For example, a portion of interior passageway 23 that is shown on the right side (as viewed) of longitudinal axis L1 in FIG. 5 can be larger than a portion of interior passageway 23 that is shown on the left side (as viewed) of longitudinal axis L1 in FIG. 5. In other examples, shroud 14 and portions of interior passageway 23 can have other asymmetries about longitudinal axis L1. In yet other examples, shroud 14 and interior passageway 23 can be symmetric about longitudinal axis L1.

Flow distributor 12 is positioned within shroud 14 in interior passageway 23. Specifically, flow distributor 12 extends from and is continuous with interior surface 22 at floor 24. Flow distributor 12 extends in a downstream direction from floor 24. First surface 28 is at an exterior of flow distributor 12. First surface 28 is also at a downstream side of flow distributor 12. Second surface 30 is at an interior of flow distributor 12. Second surface 30 is also at an upstream side of flow distributor 12. Each of first surface 28 and second surface 30 can be continuous with interior surface 22. First surface 28 and second surface 30 meet at or along edges of openings 32. In some examples (e.g., as shown in FIGS. 3-5), first surface 28 and second surface 30 also meet at an edge of top opening 33. Flow distributor 12 can be positioned such that longitudinal axis L1 of flow distributor 12 is aligned (i.e., the same) as a longitudinal axis of inlet 16.

Body 26 is a hollow, main portion of flow distributor 12 that extends or protrudes from floor 24 in a downstream direction with respect to a flow path of manifold 10. Body 26 is defined by first surface 28 and second surface 30. In some examples, body 26 can be generally dome-shaped (i.e., domed). In other examples, body 26 can be conical or frustoconical. As such, body 26 can be wider adjacent to floor 24 and tapered toward an opposite or top end (e.g., at top opening 33) of flow distributor 12. In yet other examples, body 26 is not tapered and can instead have a generally cylindrical shape.

Figure 6A:
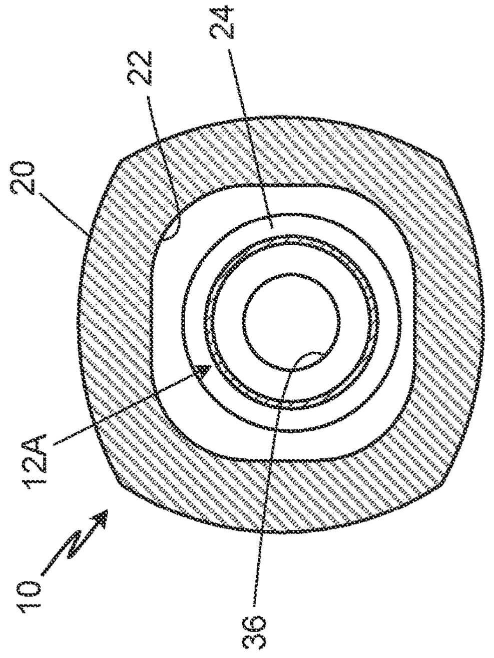
FIGS. 6A-6D are cross-sectional views of the fluid manifold taken at line 6-6 of FIG. 2 showing alternative cross-sectional shapes of the flow distributor.
Figure 6B:
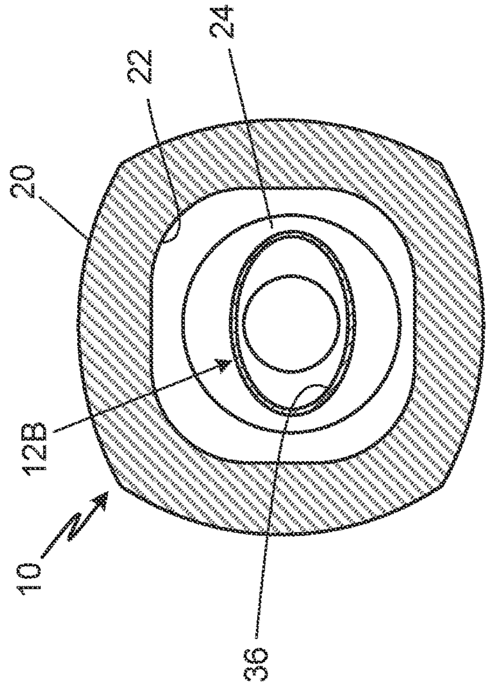
Figure 6C:
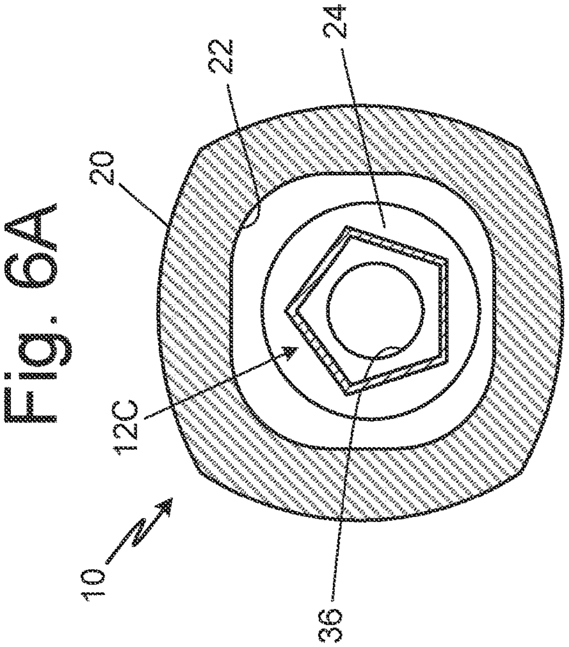
Figure 6D:
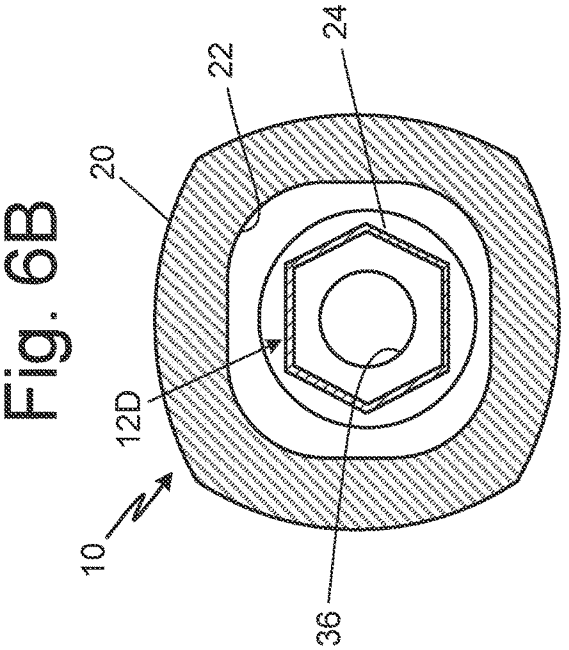

Referring now to FIGS. 6A-6D, the cross-sectional geometry of flow distributor 12 will be described in greater detail. Flow distributors 12A-12D are examples of flow distributor 12 with different cross-sectional shapes. For example, as shown in FIG. 6A, flow distributor 12A has a circular cross-sectional area. As shown in FIG. 6B, flow distributor 12B has an oval or oblong cross-sectional area. As shown in FIG. 6C, flow distributor 12C has a pentagonal cross-sectional area. As shown in FIG. 6D, flow distributor 12D has a hexagonal cross-sectional area. It should be understood that other examples of flow distributor 12 can have other cross-sectional areas, such as other polygonal, arcuate, or even irregular shapes. In yet other examples, a cross-sectional shape of flow distributor 12 can change along longitudinal axis L1 of flow distributor 12.

Referring again to FIGS. 4-5, second surface 30 defines central cavity 34 within body 26 of flow distributor 12. Thus, body 26 is hollow and surrounds central cavity 34. Central cavity 34 is fluidly connected to and continuous with primary channel 36 and interior passageway 23.

As will be described in greater detail below with respect to FIGS. 10A-10E, openings 32 are arranged on flow distributor 12. Openings 32 extend from first surface 28 to second surface 30 such that central cavity 34 is in fluid communication with interior passage 23 (i.e., downstream of flow distributor 12). In some examples (e.g., as shown in FIGS. 3-5), flow distributor 12 includes top opening 33 at the top end of flow distributor 12. In other examples, top opening 33 may not be present. Like openings 32, top opening 33 extends from first surface 28 to second surface 30. For example, top opening 33 can be positioned centrally at the top end. Top opening 33 can also be larger in size than other openings 32. It should be understood, however, that top opening 33 can have any suitable shape, size, and arrangement (i.e., positioning) on flow distributor 12.

Outlet end 18 of manifold 10 forms a second, or downstream, end of manifold 10 that is opposite inlet 16. Like inlet 16, outlet end 18 forms an opening into the fluid system of manifold 10. Because interior passageway 23 extends from primary channel 36 of inlet 16 to outlet end 18, outlet end 18 is in fluid communication with inlet 16. Manifold 10 can connect to another component or components at outlet end 18.

In operation, inlet 16 of manifold 10 is configured to receive a fluid (not shown) from another component(s) or duct. The fluid can be any type of fluid, including air, water, lubricant, fuel, or another fluid. The other component or duct from which fluid is delivered to manifold 10 can be connected to manifold 10 at connection portion 38 of inlet 16.

A flow path of manifold 10 (i.e., the path along which the fluid flows within manifold 10) can include primary channel 36 of inlet 16, central cavity 34 of flow distributor 12, and interior passageway 23 within shroud 14. In sequential order, the fluid flows from inlet 16 through flow distributor 12 to outlet end 18. More specifically, the fluid entering manifold 10 at inlet 16 is channeled through primary channel 36 to central cavity 34 of flow distributor 12. The fluid encounters upstream surface 30 of flow distributor 12 then passes through openings 32 and top opening 33 in a direction from upstream surface 30 to downstream surface 28. As such, fluid flowing through flow distributor 12 is distributed within interior passage 23 (i.e., downstream of flow distributor 12). The fluid can be directed generally toward outlet end 18. From outlet end 18, the fluid can be discharged from manifold 10 into another component or components. For example, manifold 10 can be configured as a header for a heat exchanger and the fluid can flow from outlet end 18 into channels of a heat exchanger core. In other examples, manifold 10 can be implemented with any component or components that would benefit from flow distribution features for flow balance.

Manifold 10 and flow distributor 12 can be integrally formed. To be integrally formed, manifold 10 and its component parts can be formed partially or entirely by additive manufacturing. For metal components (e.g., nickel-based superalloys, aluminum, titanium, etc.) exemplary additive manufacturing processes include powder bed fusion techniques such as direct metal laser sintering (DMLS), laser net shape manufacturing (LNSM), electron beam manufacturing (EBM), to name a few, non-limiting examples. For polymer or plastic components, stereolithography (SLA) can be used. Additive manufacturing is particularly useful in obtaining unique geometries and for reducing the need for welds or other attachments (e.g., between a manifold and flow distributor). However, it should be understood that other suitable manufacturing processes can be used. Additionally, post-manufacture machining techniques can be utilized to form features of manifold 10, such as threads of connection portion 38. In other examples, features like connection portion 38 can be integrally formed with additively manufactured manifold 10.

During an additive manufacturing process, manifold 10 can be formed layer by layer to achieve varied dimensions (e.g., cross-sectional area, wall thicknesses, curvature, etc.) and complex internal passages and/or components. Each additively manufactured layer creates a new horizontal build plane to which a subsequent layer of manifold 10 is fused. That is, the build plane for the additive manufacturing process remains horizontal but shifts vertically by defined increments (e.g., one micrometer, one hundredth of a millimeter, one tenth of a millimeter, a millimeter, or other distances) as manufacturing proceeds. Therefore, manifold 10 can be additively manufactured as a single, monolithic unit or part. FIGS. 1-6D show manifold 10 already fully manufactured.

Additive manufacturing techniques allow manifold 10 to be integrally formed as a single part with flow distributor 12. Moreover, manifold 10 including integrally formed flow distributor 12 can be additively manufactured along with a larger component, such as a heat exchanger. That is, a heat exchanger or other component can be additively manufactured to include integrally formed manifold 10 and flow distributor 12 such that the heat exchanger or other component including manifold 10 and flow distributor 12 is a single, monolithic part. The integral formation of manifold 10 with flow distributor 12 by additive manufacturing allows for the consolidation of parts and can reduce or eliminate the need for any post-process machining that is typically required with traditionally manufactured components.

In general, additive manufacturing permits construction of a higher fidelity part driven by computational fluid dynamics (CFD) analysis to distribute fluid flow accurately and evenly. More specifically, additive manufacturing permits the creation of more complex or organic geometries that would otherwise be difficult or impossible to manufacture through traditional methods. The overall flow distribution design (i.e., design of integral flow distributor 12) can be determined and/or modified based on CFD analyses and simulations. The size, shape, and/or arrangement of openings 32, top opening 33, and/or flow distributor 12 can be optimized through CFD analyses. It is advantageous for optimization to have more options and greater flexibility in possible flow distribution design geometries.

The three-dimensional size, shape, and/or positioning of flow distributor 12 can be more accurately tailored to redistribute fluid flow based on desired flow distribution characteristics. Additionally, or alternatively, the size, shape, and/or arrangement of openings 32 and top opening 33 can vary throughout flow distributor 12 depending on the desired flow distribution characteristics. Variations in the size, shape, and/or arrangement of openings 32 and top opening 33 can allow for improved flow distribution in a variety of fluid manifold configurations. Flow distributor 12 having variations in the size, shape, and/or arrangement of openings 32 and top opening 33 presents an advantage over traditional flow distributors that are limited to having uniformly sized and shaped openings because the present design can be more accurately tailored to redistribute flow based on inlet conditions of a particular fluid manifold or of a particular fluid (e.g., fluid type, flow velocity, inlet orientation, manifold size, etc.).

Figure 7:
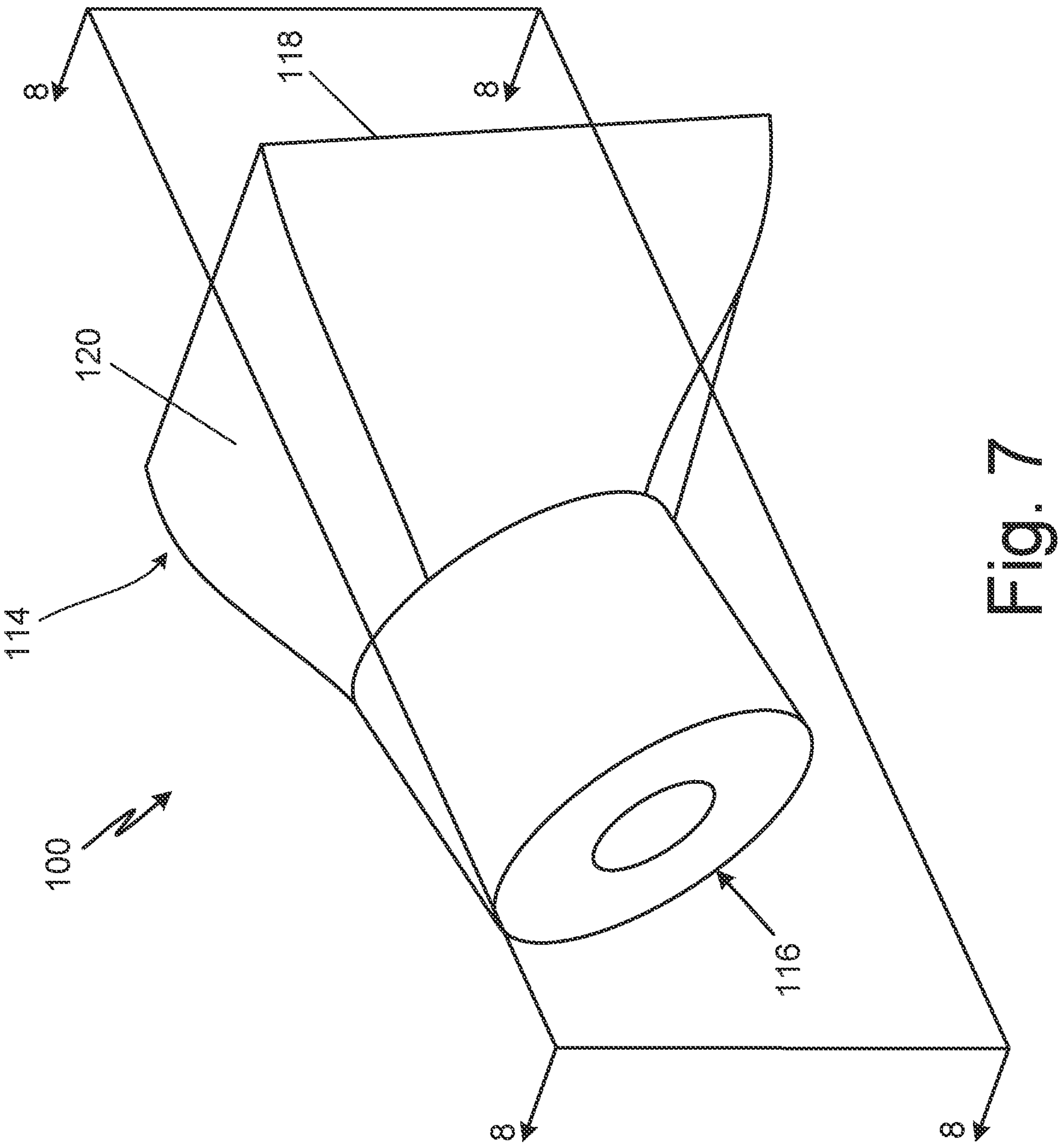
FIG. 7 is an isometric view of a fluid manifold with an angled inlet.
Figure 8:
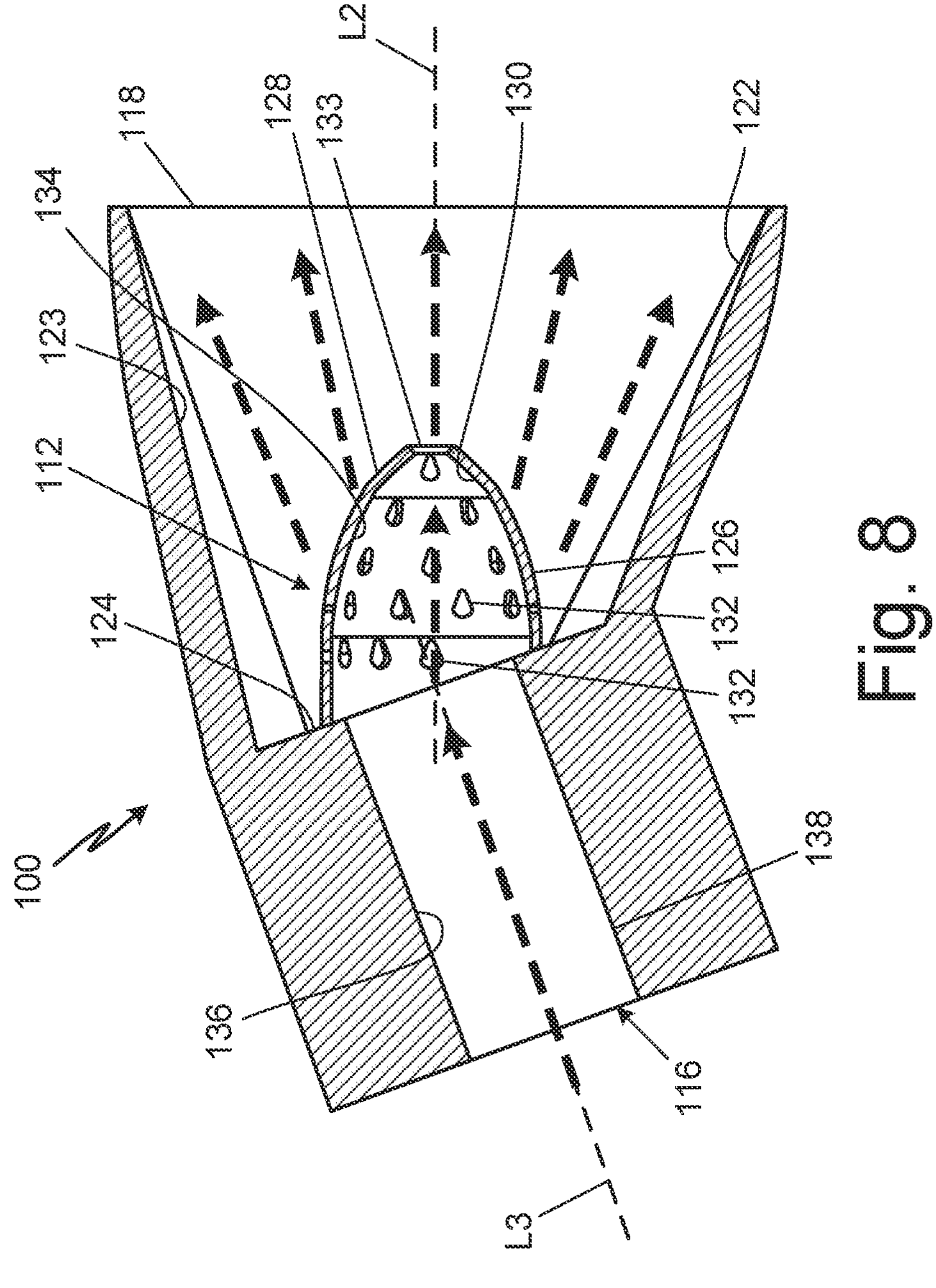
FIG. 8 is a cross-sectional view of the fluid manifold taken at plane 8-8 of FIG. 7 showing a flow distributor.

FIGS. 7 and 8 will be discussed together. FIG. 7 is an isometric view of fluid manifold 100 with angled inlet 116. FIG. 8 is a cross-sectional view of fluid manifold 100 taken at plane 8-8 of FIG. 7 showing angled flow distributor 112.

Manifold 100 includes angled flow distributor 112, shroud 114, angled inlet 116, and outlet end 118. Shroud 114 includes exterior surface 120, interior surface 122, interior passageway 123, and floor 124. Angled flow distributor 112 includes body 126, first surface 128, second surface 130, openings 132, top opening 133, and central cavity 134. Angled flow distributor 112 defines longitudinal axis L2. Angled inlet 116 includes primary channel 136 and connection portion 138 and defines longitudinal axis L3. Manifold 100 has essentially the same structure and function as described above with reference to manifold 10 in FIGS. 1-6D, except manifold 100 includes angled flow distributor 112 and angled inlet 116 rather than an aligned flow distributor and inlet (e.g., as shown in FIGS. 1-6D).

As shown in FIG. 8, inlet 116 can have longitudinal axis L3 which is not aligned with longitudinal axis L2 of flow distributor 112. That is, longitudinal axis L2 and longitudinal axis L3 can intersect to form a non-zero angle. The non-zero angle can be any non-zero angle. Further, the non-zero angle can be based on conditions of inlet 116. For example, inlet 116 can be angled with respect to flow distributor 112 due to a geometry of another component(s) or duct that is connected to manifold 100 at inlet 116. Inlet 116 may be positioned at an angle suitable to accommodate the connected component(s).

Fluid flowing within manifold 100 flows from angled inlet 116 through angled flow distributor 112 to outlet end 118. More specifically, the fluid entering manifold 100 at inlet 116 is channeled through primary channel 136 to central cavity 134 of flow distributor 112. Because longitudinal axis L2 of flow distributor 112 and longitudinal axis L3 of inlet 116 are not aligned, the fluid flow is redirected (i.e., turns) as it passes from primary channel 136 into central cavity 134 (as indicated by arrows in FIG. 8). The fluid encounters upstream surface 130 of flow distributor 112 then passes through openings 132 and top opening 133 in a direction from upstream surface 130 to downstream surface 128. As such, fluid flowing through flow distributor 112 is distributed within interior passage 123 (i.e., downstream of flow distributor 112). The fluid can be directed generally toward outlet end 118. From outlet end 118, the fluid can be discharged from manifold 100 into another component or components.

Manifold 100 and flow distributor 112 can be integrally formed. To be integrally formed, manifold 100 and its component parts can be formed partially or entirely by additive manufacturing. For metal components (e.g., nickel-based superalloys, aluminum, titanium, etc.) exemplary additive manufacturing processes include powder bed fusion techniques such as direct metal laser sintering (DMLS), laser net shape manufacturing (LNSM), electron beam manufacturing (EBM), to name a few, non-limiting examples. For polymer or plastic components, stereolithography (SLA) can be used. Additive manufacturing is particularly useful in obtaining unique geometries and for reducing the need for welds or other attachments (e.g., between a manifold and flow distributor). However, it should be understood that other suitable manufacturing processes can be used. Additionally, post-manufacture machining techniques can be utilized to form features of manifold 100, such as threads of connection portion 138. In other examples, features like connection portion 138 can be integrally formed with additively manufactured manifold 100.

During an additive manufacturing process, manifold 100 can be formed layer by layer to achieve varied dimensions (e.g., cross-sectional area, wall thicknesses, curvature, etc.) and complex internal passages and/or components. Each additively manufactured layer creates a new horizontal build plane to which a subsequent layer of manifold 100 is fused. That is, the build plane for the additive manufacturing process remains horizontal but shifts vertically by defined increments (e.g., one micrometer, one hundredth of a millimeter, one tenth of a millimeter, a millimeter, or other distances) as manufacturing proceeds. Therefore, manifold 100 can be additively manufactured as a single, monolithic unit or part. FIGS. 7-8 show manifold 100 already fully manufactured.

Additive manufacturing techniques allow manifold 100 to be integrally formed as a single part with flow distributor 112. Moreover, manifold 100 including integrally formed flow distributor 112 can be additively manufactured along with a larger component, such as a heat exchanger. That is, a heat exchanger or other component can be additively manufactured to include integrally formed manifold 100 and flow distributor 112 such that the heat exchanger or other component including manifold 100 and flow distributor 112 is a single, monolithic part. The integral formation of manifold 100 with flow distributor 112 by additive manufacturing allows for the consolidation of parts and can reduce or eliminate the need for any post-process machining that is typically required with traditionally manufactured components.

In general, additive manufacturing permits construction of a higher fidelity part driven by computational fluid dynamics (CFD) analysis to distribute fluid flow accurately and evenly. More specifically, additive manufacturing permits the creation of more complex or organic geometries that would otherwise be difficult or impossible to manufacture through traditional methods. The overall flow distribution design (i.e., design of integral flow distributor 112) can be determined and/or modified based on CFD analyses and simulations. The size, shape, and/or arrangement of openings 132, top opening 133, and/or flow distributor 112 can be optimized through CFD analyses. It is advantageous for optimization to have more options and greater flexibility in possible flow distribution design geometries.

The three-dimensional size, shape, and/or positioning of angled flow distributor 112 can be more accurately tailored to redistribute fluid flow based on desired flow distribution characteristics. Specifically, the non-zero angle between longitudinal axis L2 of flow distributor 112 and longitudinal axis L3 of inlet 116 allows flow distributor 112 to improve flow distribution in configurations where the inlet is not aligned with a center of the manifold. Therefore, flow distributor 112 enables the integral construction and optimization benefits described herein to be implemented in a greater variety of fluid flow systems.

Additionally, or alternatively, the size, shape, and/or arrangement of openings 132 and top opening 133 can vary throughout flow distributor 112 depending on the desired flow distribution characteristics. Variations in the size, shape, and/or arrangement of openings 132 and top opening 133 can allow for improved flow distribution in a variety of fluid manifold configurations. Flow distributor 112 having variations in the size, shape, and/or arrangement of openings 132 and top opening 133 presents an advantage over traditional flow distributors that are limited to having uniformly sized and shaped openings because the present design can be more accurately tailored to redistribute flow based on inlet conditions of a particular fluid manifold or of a particular fluid (e.g., fluid type, flow velocity, inlet orientation, manifold size, etc.).

Figure 9:
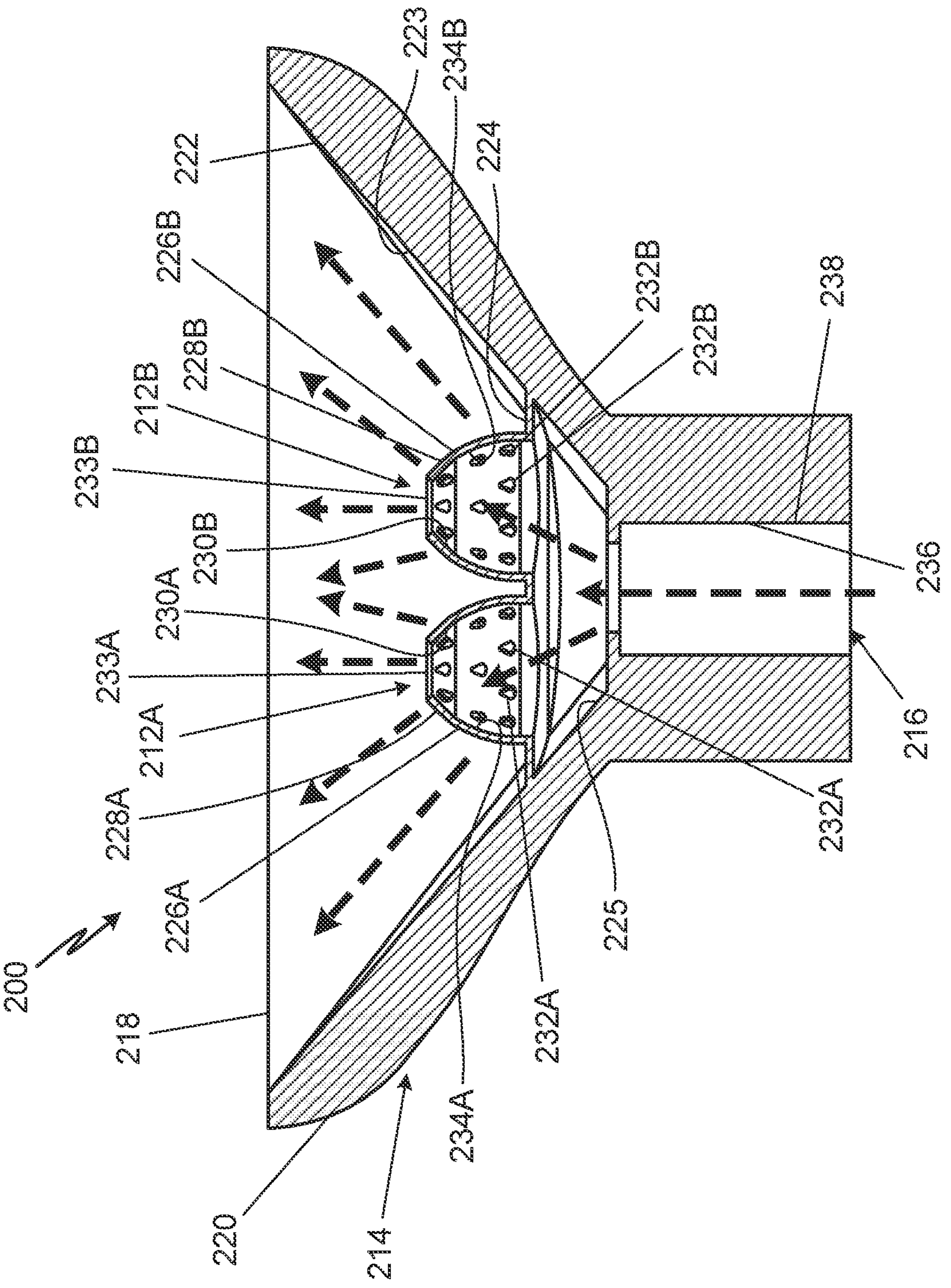
FIG. 9 is a cross-sectional view of a fluid manifold including multiple flow distributors.

FIG. 9 is a cross-sectional view of fluid manifold 200 including multiple flow distributors 212. Manifold 200 includes first flow distributor 212A, second flow distributor 212B, shroud 214, inlet 216, and outlet end 218. Shroud 214 includes exterior surface 220, interior surface 222, interior passageway 223, floor 224, and intermediate passageway 225. First and second flow distributors 212A and 212B include body 226A and 226B, first surface 228A and 228B, second surface 230A and 230B, openings 232A and 232B, top opening 233A and 233B, and central cavity 234A and 234B, respectively. Inlet 216 includes primary channel 236 and connection portion 238. Manifold 200 has essentially the same structure and function as described above with reference to manifold 10 in FIGS. 1-6D, except manifold 200 additionally includes multiple flow distributors 212A-212B and intermediate passageway 225. Each of flow distributors 212A and 212B includes essentially the same components, which are labeled respectively with A or B, but which will be referred to generally herein by the shared reference number. For example, body 226 refers collectively to body 226A and body 226B.

Intermediate passageway 225 is an additional passageway or cavity within shroud 214 that is upstream of floor 224 and bounded by interior surface 222. Intermediate passageway 225 extends between primary channel 236 of inlet 216 and floor 224 of shroud 214. As such, intermediate passageway 225 is fluidly connected to and continuous with primary channel 236. Intermediate passageway 225 separates floor 224 from an interior end of primary channel 236 such that multiple flow distributors 212 can be positioned on floor 224. A distance from the interior end of primary channel 236 to floor 224 (i.e., a height of intermediate passageway 225) can depend on a number, size, and/or arrangement of flow distributors 212. Thus, intermediate passageway 225 can be taller or shorter than the example shown in FIG. 9.

Multiple flow distributors 212 are positioned within shroud 214 in interior passageway 223. As shown in FIG. 9, manifold 200 can include two flow distributors 212. In other examples, manifold 200 can include more than two flow distributors 212. In yet other examples, manifold 200 can include any suitable number of flow distributors 212.

Flow distributors 212 extend from and are continuous with interior surface 222 at floor 224. Flow distributors 212 extend in a downstream direction from floor 224. Flow distributors 212 can be directly adjacent one another or spaced apart on floor 224. Flow distributors 212 can also have parallel longitudinal axes (e.g., as shown in FIG. 9) or can be angled with respect to each other. Moreover, each of flow distributors 212 can have a similar size and shape (e.g., as shown in FIG. 9) or can have different sizes and shapes.

Central cavities 234 of flow distributors 212 are fluidly connected to and continuous with intermediate passageway 225 and interior passageway 223. Openings 232 extend from first surface 228 to second surface 230 of each flow distributor 212 such that central cavities 234 are in fluid communication with interior passage 223 (i.e., downstream of flow distributors 212). Each of flow distributors 212 can have a same or different configuration of openings 232.

Fluid flowing within manifold 200 flows from inlet 216 through flow distributors 212 to outlet end 218. More specifically, the fluid entering manifold 200 at inlet 216 is channeled through primary channel 236 to intermediate passageway 225. From intermediate passageway 225, fluid flows into central cavities 234 of flow distributors 212. The fluid encounters upstream surfaces 230 of flow distributors 212 then passes through openings 232 and top opening 233 in a direction from upstream surfaces 230 to downstream surfaces 228. As such, fluid flowing through flow distributors 212 is distributed within interior passageway 223 (i.e., downstream of flow distributors 212). The fluid can be directed generally toward outlet end 218. From outlet end 218, the fluid can be discharged from manifold 200 into another component or components.

Manifold 200 and flow distributors 212 can be integrally formed. To be integrally formed, manifold 200 and its component parts can be formed partially or entirely by additive manufacturing. For metal components (e.g., nickel-based superalloys, aluminum, titanium, etc.) exemplary additive manufacturing processes include powder bed fusion techniques such as direct metal laser sintering (DMLS), laser net shape manufacturing (LNSM), electron beam manufacturing (EBM), to name a few, non-limiting examples. For polymer or plastic components, stereolithography (SLA) can be used. Additive manufacturing is particularly useful in obtaining unique geometries and for reducing the need for welds or other attachments (e.g., between a manifold and flow distributor). However, it should be understood that other suitable manufacturing processes can be used. Additionally, post-manufacture machining techniques can be utilized to form features of manifold 200, such as threads of connection portion 238. In other examples, features like connection portion 238 can be integrally formed with additively manufactured manifold 200.

During an additive manufacturing process, manifold 200 can be formed layer by layer to achieve varied dimensions (e.g., cross-sectional area, wall thicknesses, curvature, etc.) and complex internal passages and/or components. Each additively manufactured layer creates a new horizontal build plane to which a subsequent layer of manifold 200 is fused. That is, the build plane for the additive manufacturing process remains horizontal but shifts vertically by defined increments (e.g., one micrometer, one hundredth of a millimeter, one tenth of a millimeter, a millimeter, or other distances) as manufacturing proceeds. Therefore, manifold 200 can be additively manufactured as a single, monolithic unit or part. FIG. 9 shows manifold 200 already fully manufactured.

Additive manufacturing techniques allow manifold 200 to be integrally formed as a single part with flow distributors 212. Moreover, manifold 200 including integrally formed flow distributors 212 can be additively manufactured along with a larger component, such as a heat exchanger. That is, a heat exchanger or other component can be additively manufactured to include integrally formed manifold 200 and flow distributors 212 such that the heat exchanger or other component including manifold 200 and flow distributors 212 is a single, monolithic part. The integral formation of manifold 200 with flow distributors 212 by additive manufacturing allows for the consolidation of parts and can reduce or eliminate the need for any post-process machining that is typically required with traditionally manufactured components.

In general, additive manufacturing permits construction of a higher fidelity part driven by computational fluid dynamics (CFD) analysis to distribute fluid flow accurately and evenly. More specifically, additive manufacturing permits the creation of more complex or organic geometries that would otherwise be difficult or impossible to manufacture through traditional methods. The overall flow distribution design (i.e., design of integral flow distributors 212) can be determined and/or modified based on CFD analyses and simulations. The size, shape, and/or arrangement of openings 232, top opening 233, and/or flow distributors 212 can be optimized through CFD analyses. It is advantageous for optimization to have more options and greater flexibility in possible flow distribution design geometries.

The three-dimensional size, shape, and/or positioning of multiple flow distributors 212 can be more accurately tailored to redistribute fluid flow based on desired flow distribution characteristics. Specifically, manifold 200 including multiple flow distributors 212 can improve flow distribution in configurations where the manifold is sufficiently large (e.g., has a large interior passageway 223) such that fluid flow may not be adequately distributed by a single flow distributor. Therefore, flow distributors 212 enable the integral construction and optimization benefits described herein to be implemented in a greater variety of fluid flow systems.

Additionally, or alternatively, the size, shape, and/or arrangement of openings 232 and top opening 233 can vary throughout flow distributors 212 depending on the desired flow distribution characteristics. Variations in the size, shape, and/or arrangement of openings 232 and top opening 233 can allow for improved flow distribution in a variety of fluid manifold configurations. Flow distributors 212 having variations in the size, shape, and/or arrangement of openings 232 and top opening 233 present an advantage over traditional flow distributors that are limited to having uniformly sized and shaped openings because the present design can be more accurately tailored to redistribute flow based on inlet conditions of a particular fluid manifold or of a particular fluid (e.g., fluid type, flow velocity, inlet orientation, manifold size, etc.).

FIGS. 10A-10E are enlarged side views of flow distributors 300A-300E showing alternative configurations of openings 302A-302E. Flow distributors 300A-300E include openings 302A-302E, respectively. Openings 302B are arranged in rows 304B. Flow distributors 300A-300E with openings 302A-302E are examples of flow distributor 12 and openings 32 (FIGS. 1-6D), flow distributor 112 and openings 132 (FIGS. 7-8), or flow distributors 212 and openings 232 (FIG. 9) in various configurations.

Figure 10A:
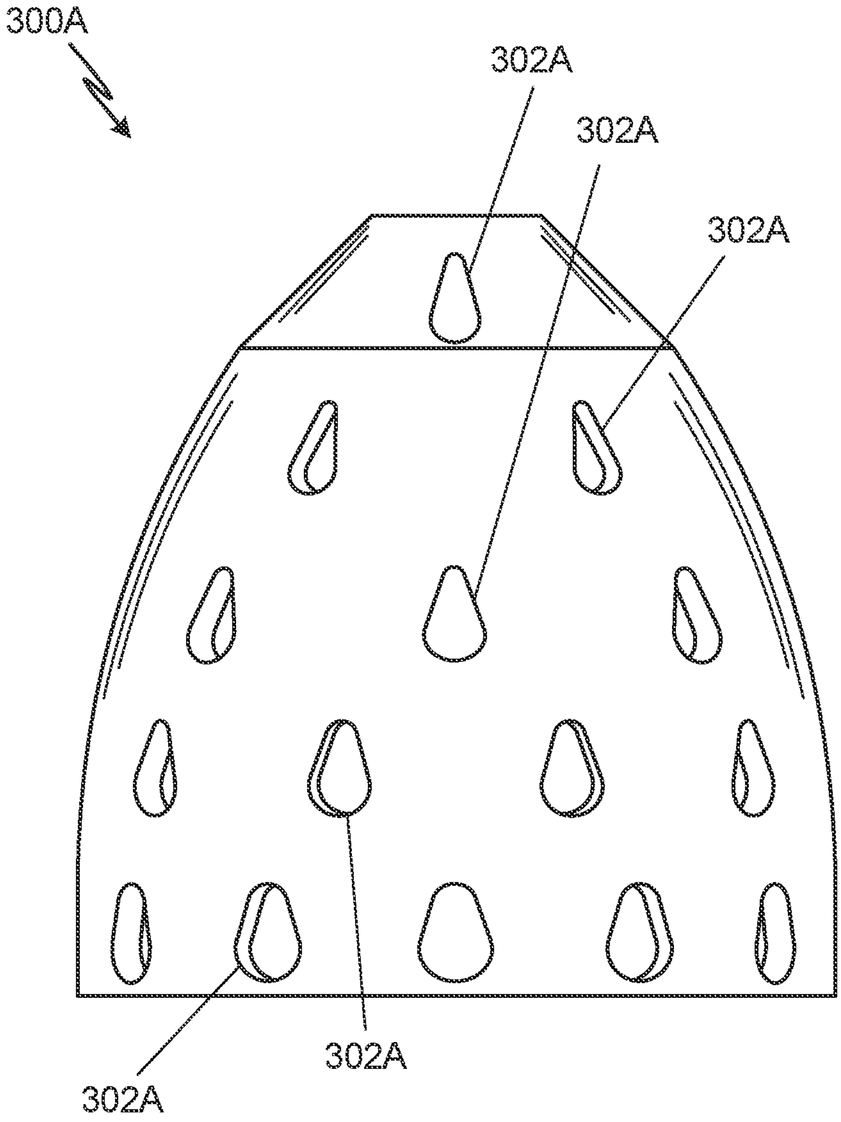
FIGS. 10A-10E are enlarged side views of a flow distributor showing alternative configurations of openings.
Figure 10C:
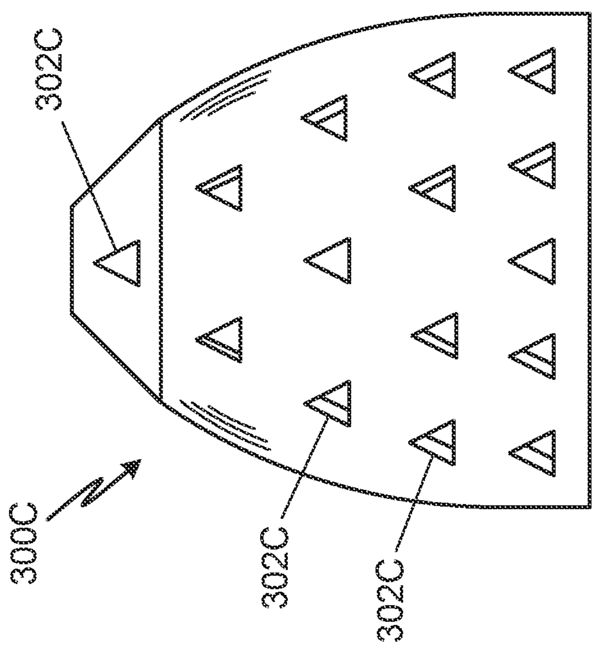

Generally, openings 302A-302E of respective flow distributors 300A-300B can be any suitable shape. For example, as shown in FIG. 10A, flow distributor 300A has rounded, tear drop shaped openings 302A. As shown in FIG. 10C, flow distributor 300C has triangular openings 302C. As shown in FIG. 10D, flow distributor 300D has rhombus shaped openings 302D. As shown in FIG. 10E, flow distributor 300E has star shaped openings 302E. It should be understood that other examples of flow distributors 300A-300E can have differently shaped openings 302A-302E, such as other polygonal, arcuate, or even irregular shapes.

Figure 10B:
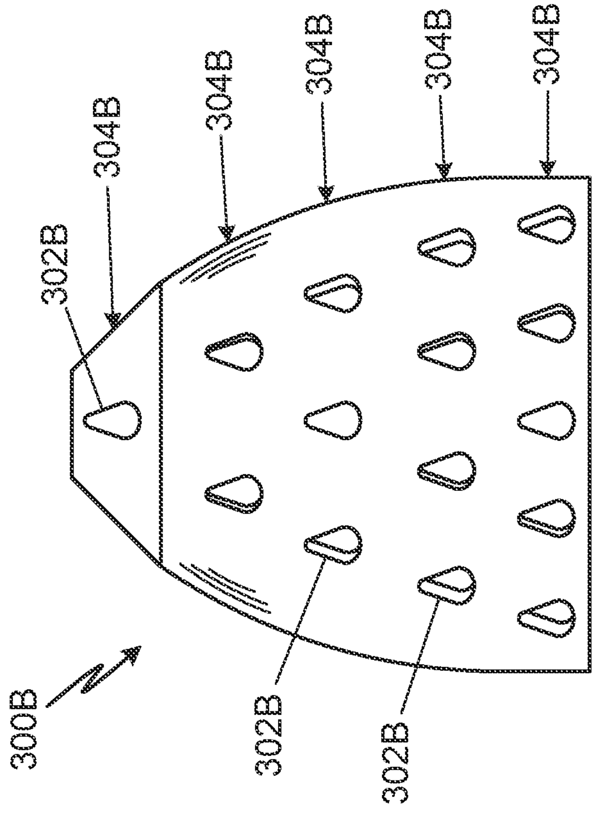
Figure 10E:
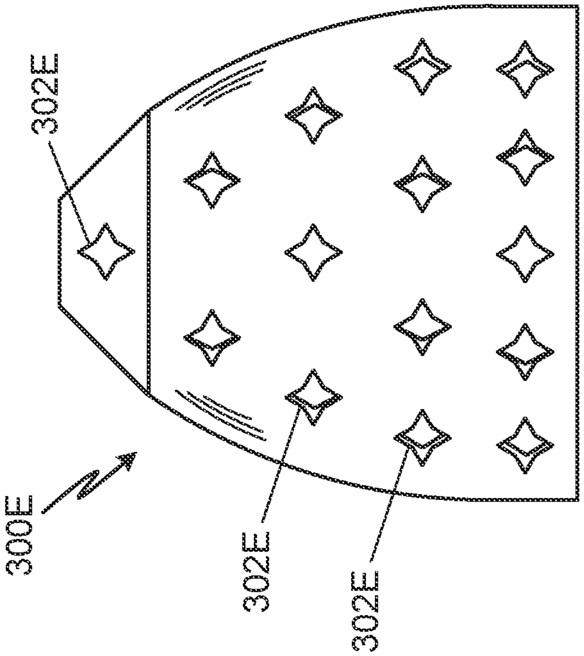
Figure 10D:
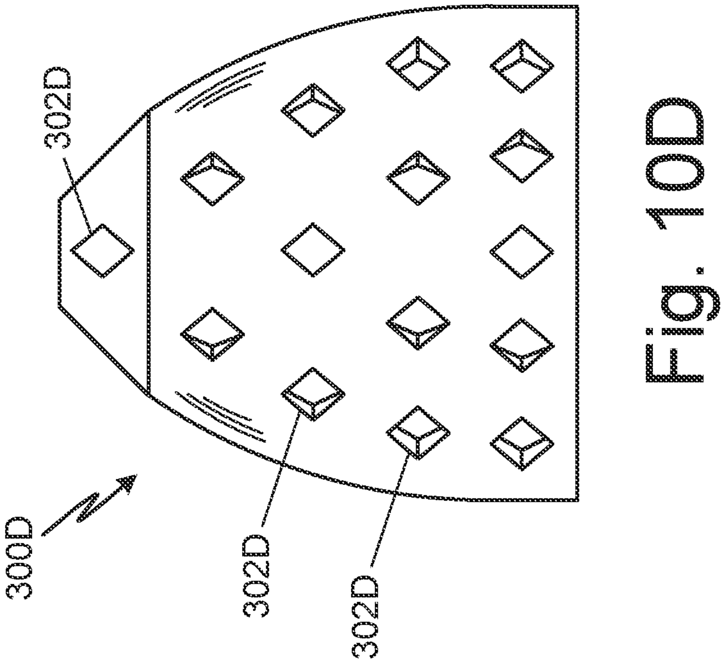

Referring now to FIGS. 10A and 10B, the size and shape of openings 302A and 302B varies throughout flow distributors 300A and 300B, respectively. As shown in FIG. 10A, the size and shape of openings 302A varies along a longitudinal axis of flow distributor 300A. Specifically, openings 302A are larger and wider at a first end of flow distributor 300A (e.g., an end that is continuous with floor 24 of manifold 10) and progressively smaller and narrower towards a longitudinally opposite second end. In other examples, this relationship can be reversed such that openings 302A are smaller and narrower at the first end of flow distributor 300A and progressively larger and wider towards the longitudinally opposite second end.

As shown in FIG. 10B, openings 302B can be arranged in rows 304B around flow distributor 300B. The size and shape of openings 302B varies laterally along rows 304B. Specifically, openings 302B are larger and wider at a first side of flow distributor 300B and progressively smaller and narrower towards a laterally opposite second side. In other examples, this relationship can be reversed such that openings 302B are smaller and narrower at the first side of flow distributor 300B and progressively larger and wider towards the laterally opposite second side.

In yet other examples, the size and/or shape of openings 302A and 302B can vary in clusters or sporadically throughout flow distributors 300A and 300B, rather than the progressive variation shown in FIGS. 10A and 10B. As shown in FIGS. 10C-10E, the size and shape of openings 302C-302E can also be uniform throughout flow distributors 300C-300E.

A density of openings 302A-302E also varies throughout flow distributors 300A-300E, respectively. As shown in each of FIGS. 10A-10E, openings 302A-302E are more densely arranged at a first end of flow distributors 300A-300E. Openings 302A-302E become progressively less dense towards a longitudinally opposite second end. In other examples, this relationship can be reversed such that openings 302A-302E are less densely arranged at the first end of flow distributors 300A-300E and progressively denser towards the longitudinally opposite second end.

In yet other examples, the density of openings 302A-302E can vary in clusters or sporadically throughout flow distributors 300A-300E, rather than the progressive variation shown in FIGS. 10A-10E. In further examples, the density of openings 302A-302E can be uniform throughout flow distributors 300A-300E.

When flow distributors 300A-300E are implemented in a fluid manifold (e.g., manifold 10 of FIGS. 1-6D, manifold 100 of FIGS. 7-8, or manifold 200 of FIG. 9), fluid flowing through the manifold passes through openings 302A-302E. The size, shape, and arrangement of openings 302A-302E can modify the flow characteristics of the fluid as it passes through flow distributors 300A-300E to redistribute or direct the flow. For example, there can be increased flow through a portion of flow distributor 302B where the size and/or density of openings 302B is increased. Likewise, there can be decreased flow through a portion of flow distributor 302B where the size and/or density of openings 302B is decreased. Fluid flow is distributed (e.g., within a fluid manifold) after passing through respective openings 302A-302E of flow distributors 300A-300E.

In general, additive manufacturing permits construction of a higher fidelity part driven by computational fluid dynamics (CFD) analysis to distribute fluid flow accurately and evenly. More specifically, additive manufacturing permits the creation of more complex or organic geometries that would otherwise be difficult or impossible to manufacture through traditional methods. For example, certain sizes, shapes, and arrangements of openings 302A-302E may be possible with additive manufacturing but not feasible with traditional manufacturing techniques. The overall flow distribution design (i.e., design of flow distributors 300A-300E) can be determined and/or modified based on CFD analyses and simulations. The size, shape, and/or arrangement of openings 302A-302E and of flow distributors 300A-300E can be optimized through CFD analyses. It is advantageous for optimization to have more options and greater flexibility in possible flow distribution design geometries.

The size, shape, and/or arrangement of openings 302A-302E can vary throughout flow distributors 300A-300E depending on the desired flow distribution characteristics. Variations in the size, shape, and/or arrangement of openings 302A-302E can allow for improved flow distribution in a variety of fluid manifold configurations. Flow distributors 300A-300E having variations in the size, shape, and/or arrangement of openings 302A-302E present an advantage over traditional flow distributors that are limited to having uniformly sized and shaped openings because the present design can be more accurately tailored to redistribute flow based on inlet conditions of a particular fluid manifold or of a particular fluid (e.g., fluid type, flow velocity, inlet orientation, manifold size, etc.).

Discussion of Possible Embodiments

The following are non-exclusive descriptions of possible embodiments of the present invention.

A fluid manifold includes an inlet comprising an opening into an interior of the fluid manifold, an outlet end that is positioned opposite the inlet and that is in fluid communication with the inlet, a shroud extending between the inlet and the outlet end and surrounding a flow path of the fluid manifold, and a first flow distributor positioned within the interior of the fluid manifold. The first flow distributor includes a hollow body that extends in a downstream direction. The hollow body includes a first surface at a downstream side of the first flow distributor and a second surface at an upstream side of the first flow distributor, a central cavity defined by the second surface of the hollow body, and openings extending from the first surface to the second surface such that a fluid can pass from the central cavity through the openings to be directed within the fluid manifold. The first flow distributor and the fluid manifold are integrally formed.

The fluid manifold of the preceding paragraph can optionally include, additionally and/or alternatively, any one or more of the following features, configurations and/or additional components:

The shroud can include an exterior surface and an interior surface, the interior surface can define the flow path of the fluid manifold, and the first flow distributor can be continuous with the interior surface of the shroud.

A longitudinal axis of the first flow distributor can form a non-zero angle with a longitudinal axis of the inlet.

The shroud can be asymmetric about a longitudinal axis of the first flow distributor.

The fluid manifold can include a second flow distributor positioned within the interior of the fluid manifold.

The fluid manifold can include an intermediate fluid passageway positioned between the inlet and the first and second flow distributors.

A shape of the openings can vary throughout the first flow distributor.

The openings can be arranged in rows and the shape of the openings can vary laterally along the rows.

The shape of the openings can vary along a longitudinal axis of the first flow distributor.

A size of the openings on a first side of the first flow distributor can be greater than a size of the openings on a laterally opposite second side of the first flow distributor.

A size of the openings can vary throughout the first flow distributor.

The openings can be arranged in rows and the size of the openings can vary laterally along the rows.

The size of the openings can vary along a longitudinal axis of the first flow distributor.

A density of the openings can vary throughout the first flow distributor.

The first flow distributor can have a circular cross-sectional area.

The openings can be tear drop shaped.

The openings can be rounded.

At least one of a size, a shape, and an arrangement of the openings can be determined based on a CFD analysis to optimize flow distribution in the fluid manifold.

A flow distributor for a fluid manifold includes a hollow body including a first surface at a downstream side of the flow distributor and a second surface at an upstream side of the flow distributor, a central cavity defined by the second surface of the hollow body, and openings extending from the first surface to the second surface such that a fluid can pass from the central cavity through the openings to be directed within the fluid manifold.

The flow distributor of the preceding paragraph can optionally include, additionally and/or alternatively, any one or more of the following features, configurations and/or additional components:

At least one of a size, a shape, and a density of the openings can vary throughout the flow distributor.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fluid manifold comprising:
- an inlet comprising an opening into an interior of the fluid manifold;
- an outlet end that is positioned opposite the inlet and that is in fluid communication with the inlet;
- a shroud extending between the inlet and the outlet end and surrounding a flow path of the fluid manifold, wherein an interior surface of the shroud defines an interior passageway that extends from a floor of the shroud to the outlet end, and wherein the shroud is bell-shaped such that a cross-sectional area of the shroud progressively widens toward the outlet end, the outlet end being wider than the floor; and
- a first flow distributor positioned within the interior passageway of the shroud and continuous with the floor, the first flow distributor comprising;
  - a hollow body that extends in a downstream direction with respect to the flow path of the fluid manifold and that protrudes toward the outlet end of the fluid manifold, the hollow body comprising;
    - a first surface at a downstream side of the first flow distributor; and
    - a second surface at an upstream side of the first flow distributor;
  - a central cavity defined by the second surface of the hollow body; and
  - openings extending from the first surface to the second surface such that a fluid can pass from the central cavity through the openings to be directed within the fluid manifold;
  - wherein the cross-sectional area of the shroud is larger than a cross-sectional area of the first flow distributor along an entirety of the shroud from the floor to the outlet end such that a fluid flowing along the flow path within the fluid manifold can flow from the central cavity of the first flow distributor through the openings to be distributed within the interior passageway;
- wherein the first flow distributor and the fluid manifold are integrally formed.

2. The fluid manifold of claim 1, wherein the shroud further comprises an exterior surface and an interior surface;
- wherein the interior surface defines the flow path of the fluid manifold; and
- wherein the first flow distributor is continuous with the interior surface of the shroud.

3. The fluid manifold of claim 1, wherein a longitudinal axis of the first flow distributor forms a non-zero angle with a longitudinal axis of the inlet.

4. The fluid manifold of claim 1, wherein the shroud is asymmetric about a longitudinal axis of the first flow distributor.

5. The fluid manifold of claim 1 further comprising:
- a second flow distributor positioned within the interior of the fluid manifold.

6. The fluid manifold of claim 5 further comprising:
- an intermediate fluid passageway positioned between the inlet and the first and second flow distributors.

7. The fluid manifold of claim 1, wherein a shape of the openings varies throughout the first flow distributor.

8. The fluid manifold of claim 7, wherein the openings are arranged in rows and the shape of the openings varies laterally along the rows.

9. The fluid manifold of claim 7, wherein the shape of the openings varies along a longitudinal axis of the first flow distributor.

10. The fluid manifold of claim 1, wherein a size of the openings varies throughout the first flow distributor.

11. The fluid manifold of claim 10, wherein the openings are arranged in rows and the size of the openings varies laterally along the rows.

12. The fluid manifold of claim 10, wherein the size of the openings varies along a longitudinal axis of the first flow distributor.

13. The fluid manifold of claim 1, wherein a density of the openings varies throughout the first flow distributor.

14. The fluid manifold of claim 1, wherein the first flow distributor has a circular cross-sectional area.

15. The fluid manifold of claim 1, wherein the openings are rounded.

16. The fluid manifold of claim 1, wherein at least one of a size, a shape, and an arrangement of the openings is determined based on a CFD analysis to optimize flow distribution in the fluid manifold.

17. The fluid manifold of claim 1, wherein at least one of a size, a shape, and a density of the openings varies throughout the flow distributor.

18. A fluid manifold comprising:

an inlet comprising an opening into an interior of the fluid manifold;

an outlet end that is positioned opposite the inlet and that is in fluid communication with the inlet;

a shroud extending between the inlet and the outlet end and surrounding a flow path of the fluid manifold; and a first flow distributor positioned within the interior of the fluid manifold, the first flow distributor comprising;

a hollow body that extends in a downstream direction, the hollow body comprising;

a first surface at a downstream side of the first flow distributor; and a second surface at an upstream side of the first flow distributor;

a central cavity defined by the second surface of the hollow body; and openings extending from the first surface to the second surface such that a fluid can pass from the central cavity through the openings to be directed within the fluid manifold;

wherein the first flow distributor and the fluid manifold are integrally formed; and wherein a size of the openings on a first side of the first flow distributor is greater than a size of the openings on a laterally opposite second side of the first flow distributor.

19. A fluid manifold comprising:

an inlet comprising an opening into an interior of the fluid manifold;

an outlet end that is positioned opposite the inlet and that is in fluid communication with the inlet;

a shroud extending between the inlet and the outlet end and surrounding a flow path of the fluid manifold; and a first flow distributor positioned within the interior of the fluid manifold, the first flow distributor comprising;

a hollow body that extends in a downstream direction, the hollow body comprising;

a first surface at a downstream side of the first flow distributor; and a second surface at an upstream side of the first flow distributor;

a central cavity defined by the second surface of the hollow body; and openings extending from the first surface to the second surface such that a fluid can pass from the central cavity through the openings to be directed within the fluid manifold;

wherein the first flow distributor and the fluid manifold are integrally formed; and wherein the openings are tear drop shaped.

* * * * *